(12) United States Patent
Jang et al.

(10) Patent No.: US 11,075,434 B2
(45) Date of Patent: Jul. 27, 2021

(54) RECHARGEABLE BATTERY

(71) Applicant: Samsung SDI Co., Ltd., Yongin-si (KR)

(72) Inventors: Myungjae Jang, Yongin-si (KR); Chiyoung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 102 days.

(21) Appl. No.: 16/303,109

(22) PCT Filed: Jun. 29, 2017

(86) PCT No.: PCT/KR2017/006906
§ 371 (c)(1),
(2) Date: Nov. 19, 2018

(87) PCT Pub. No.: WO2018/026105
PCT Pub. Date: Feb. 8, 2018

(65) Prior Publication Data
US 2019/0305288 A1    Oct. 3, 2019

(30) Foreign Application Priority Data

Aug. 1, 2016    (KR) .................. 10-2016-0098099

(51) Int. Cl.
*H01M 50/00* (2021.01)
*H01M 50/581* (2021.01)
(Continued)

(52) U.S. Cl.
CPC ........... *H01M 50/581* (2021.01); *H01M 4/64* (2013.01); *H01M 10/04* (2013.01); *H01M 10/42* (2013.01);
(Continued)

(58) Field of Classification Search
CPC ............... H01M 10/04; H01M 2/0426; H01M 2200/103; H01M 2/30; H01M 2/348
See application file for complete search history.

(56) References Cited

U.S. PATENT DOCUMENTS

| 2010/0216001 A1 | 8/2010 | Byun et al. |
| 2011/0104562 A1 | 5/2011 | Byun et al. |

(Continued)

FOREIGN PATENT DOCUMENTS

| CN | 103227310 A | 7/2013 |
| CN | 104112836 A | 10/2014 |

(Continued)

OTHER PUBLICATIONS

Extended European Search Report for corresponding European Patent Application No. 17837157.1, dated Mar. 12, 2020, 12 pages.

(Continued)

*Primary Examiner* — Cynthia H Kelly
*Assistant Examiner* — Monique M Wills
(74) *Attorney, Agent, or Firm* — Lewis Roca Rothgerber Christie LLP

(57) ABSTRACT

A rechargeable battery according to an exemplary embodiment of the present invention includes: an electrode assembly including uncoated region tabs that protrude toward one side of a coated portion; a case having a first length set in a first direction to receive the electrode assembly; a cap plate having a second length set in a second direction that crosses the first direction and a third length that is shorter than the first length and set in a third direction that crosses the second direction so as to be coupled corresponding to an opening of the case; an electrode terminal that is provided in a terminal hole of the cap plate; and a current collecting member that is disposed between the cap plate and the electrode assembly to connect the electrode terminal and the uncoated region (Continued)

tabs, and includes a fuse in a corresponding region of the electrode terminal, facing in the first direction.

12 Claims, 8 Drawing Sheets

(51) Int. Cl.
*H01M 4/64* (2006.01)
*H01M 10/42* (2006.01)
*H01M 10/04* (2006.01)
*H01M 50/172* (2021.01)
*H01M 50/531* (2021.01)
*H01M 50/543* (2021.01)

(52) U.S. Cl.
CPC ....... *H01M 50/172* (2021.01); *H01M 50/531* (2021.01); *H01M 50/543* (2021.01); *H01M 2200/103* (2013.01)

(56) References Cited

U.S. PATENT DOCUMENTS

| | | |
|---|---|---|
| 2012/0282502 A1 | 11/2012 | Kim |
| 2013/0143080 A1 | 6/2013 | Byun |
| 2013/0149570 A1 | 6/2013 | Han et al. |
| 2013/0196187 A1 | 8/2013 | Yokoyama et al. |
| 2014/0141295 A1* | 5/2014 | Guen ............ H01M 2/34 429/61 |
| 2014/0234673 A1 | 8/2014 | Byun et al. |
| 2014/0272492 A1* | 9/2014 | Lange ............ H01M 2/345 429/61 |
| 2014/0315052 A1 | 10/2014 | Byun et al. |
| 2014/0377638 A1 | 12/2014 | Kwak et al. |
| 2015/0118528 A1 | 4/2015 | Byun et al. |
| 2015/0280205 A1 | 10/2015 | Lee et al. |
| 2016/0049635 A1 | 2/2016 | Park et al. |
| 2016/0099445 A1 | 4/2016 | Park et al. |
| 2016/0204411 A1 | 7/2016 | Lee et al. |
| 2017/0025665 A1 | 1/2017 | Li et al. |
| 2017/0054136 A1* | 2/2017 | Byun ............ H01M 2/22 |

FOREIGN PATENT DOCUMENTS

| | | |
|---|---|---|
| CN | 104253256 A | 12/2014 |
| CN | 104577017 A | 4/2015 |
| CN | 105098108 A | 11/2015 |
| CN | 105789674 A | 7/2016 |
| CN | 205376627 U | 7/2016 |
| EP | 2602847 A1 | 6/2013 |
| JP | 9-135019 A | 5/1997 |
| KR | 10-1023865 B1 | 3/2011 |
| KR | 10-2011-0047611 A | 5/2011 |
| KR | 10-2012-0124026 A | 11/2012 |
| KR | 10-2014-0104187 A | 8/2014 |
| KR | 10-2015-0000678 A | 1/2015 |
| KR | 10-2015-0047417 A | 5/2015 |
| KR | 10-1531323 B1 | 6/2015 |
| KR | 10-2015-0114241 A | 10/2015 |
| KR | 10-2016-0021406 A | 2/2016 |
| KR | 10-2016-0087974 A | 7/2016 |

OTHER PUBLICATIONS

Korean Office action from corresponding Korean Application No. 10-2016-0098099, Korean Office action dated Oct. 19, 2020 (7 pgs.).

Notice of Allowance in corresponding Korean Application No. 10-2016-0098099, Korean Notice of Allowance dated Dec. 22, 2020 (5 pgs.).

Chinese Office Action from corresponding Chinese Patent Application No. 201780043905.9, Chinese Office Action dated May 6, 2021 and accompanying Search Report dated Apr. 26, 2021 (19 pgs.).

* cited by examiner

RECHARGEABLE BATTERY

CROSS-REFERENCE TO RELATED APPLICATION(S)

This application is a National Phase Patent Application of International Patent Application Number PCT/KR2017/006906, filed on Jun. 29, 2017 which claims priority of Korean Patent Application No. 10-2016-0098099, filed Aug. 1, 2016. The entire contents of both of which are incorporated herein by reference.

TECHNICAL FIELD

The present disclosure relates to a rechargeable battery. More particularly, the present disclosure relates to a rechargeable battery of which a current collecting member is provided with a fuse.

BACKGROUND ART

A rechargeable battery is a battery that is repeatedly performing charging and discharging, different from a primary battery. A rechargeable battery with small capacity is used in a portable small electronic device, such as a mobile phone, a notebook computer, and a camcorder, and a rechargeable battery with large capacity may be used as a motor driving power source for a hybrid vehicle and an electric vehicle.

For example, rechargeable batteries include an electrode assembly for charging and discharging, a case receiving the electrode assembly and an electrolyte solution, a cap plate coupled to the opening of the case, and an electrode terminal that electrically connects the electrode assembly to draw out the electrode assembly to the outside of the cap plate.

In general, the cap plate has a length that is longer than a height of the case. That is, the opening of the case becomes narrowed. The electrode terminal is provided in the cap plate, and is connected to a current collecting member that is disposed between the electrode assembly and the cap plate. The current collecting member includes a fuse that interrupts a current between the electrode terminal and the electrode assembly.

However, when the length of the cap plate is reduced and thus the opening of the case becomes narrowed, a fuse cannot be installed in the current collecting member due to a lack of space when the terminal electrode is installed in the cap plate and the electrode terminal is connected to the electrode assembly.

DISCLOSURE

Technical Problem

One aspect of the present invention is to provide a rechargeable battery where a fuse can be effectively provided in a current collecting member that connects an electrode assembly and an electrode terminal even when a length of the cap plate is reduced and thus an opening of the case becomes narrowed.

Technical Solution

A rechargeable battery according to an exemplary embodiment of the present invention includes: an electrode assembly including uncoated region tabs that protrude toward one side of a coated portion; a case having a first length set in a first direction to receive the electrode assembly; a cap plate having a second length set in a second direction that crosses the first direction and a third length that is shorter than the first length and set in a third direction that crosses the second direction so as to be coupled corresponding to an opening of the case; an electrode terminal that is provided in a terminal hole of the cap plate; and a current collecting member that is disposed between the cap plate and the electrode assembly to connect the electrode terminal and the uncoated region tabs, and includes a fuse in a corresponding region of the electrode terminal, facing in the first direction.

The electrode terminal may include: a rivet portion that is provided in the terminal hole of the cap plate; an exterior plate that is disposed at an outer side of the cap plate and connected to the rivet portion; and an interior plate that is disposed at an inner side of the cap plate to connect the rivet portion and the current collecting member.

The corresponding region may be set in the interior plate, facing in the first direction, and the fuse may be provided in the corresponding region.

The current collecting member may include: a terminal connection portion connected to the rivet portion; and a tab connection portion that is provided at an outer side of the terminal connection portion and connected to the uncoated region tab while disposing the fuse therebetween.

The electrode assembly may include a first assembly and a second assembly that are disposed in parallel with each other in the second direction, and the uncoated region tabs may include a first tab group connected to the first assembly and a second tab group connected to the second assembly.

The terminal connection portion may be connected to the rivet portion while leaning to one side of the third direction on a center line that is set by extending in the third direction from the center of the second direction, and the rivet portion may be coupled by welding to a through-hole that penetrates the interior plate and formed in the terminal connection portion.

The first tab group may be bent toward the opposite side at one side of the second direction and may be connected to the tab connection portion, while disposing the fuse therebetween, and, the second tab group may be bent toward the first tab group at the opposite side of the first tab group in the second direction and may be connected to the tab connection portion.

The first tab group and the second tab group may be respectively disposed at opposite sides of the second reaction in the center of the terminal connection portion in the third direction and then welded thereto.

The first tab group and the second tab group each may include a tab width set along the third direction, and the tab width may face the center of the rivet portion in the second direction.

The current collecting member may include a first slot and a second slot that set the terminal connection portion at the center of the second direction and divide the tab connection portion into two sides in the second direction at an outer edge of the terminal connection portion, and the fuse may be set between the first slot and the second slot at opposite sides of the third direction.

The first slot and the second slot may be formed in the shape of arcs that face each other while being concave toward the center of the terminal connection portion at opposite sides of the second direction.

An interior insulation member may include a first protrusion and a second protrusion that protrude toward the first direction corresponding to the current collecting member at opposite sides of the third direction.

The first protrusion may correspond to a side surface of the current collecting member, and the second protrusion may be coupled to a hole formed in the current collecting member.

Advantageous Effects

According to the exemplary embodiment of the present invention, the case has the first length (height), and the third length (length) of the cap plate, which has the second length (width) and the third length (length) is set to be shorter than the first length, and the corresponding region of the electrode terminal can be assured in the current collecting member eve when then the third length of the cap plate is shortened and thus the opening of the case is narrowed, and accordingly the fuse can be effectively provided in the corresponding region.

MODE FOR INVENTION

Figure 1:
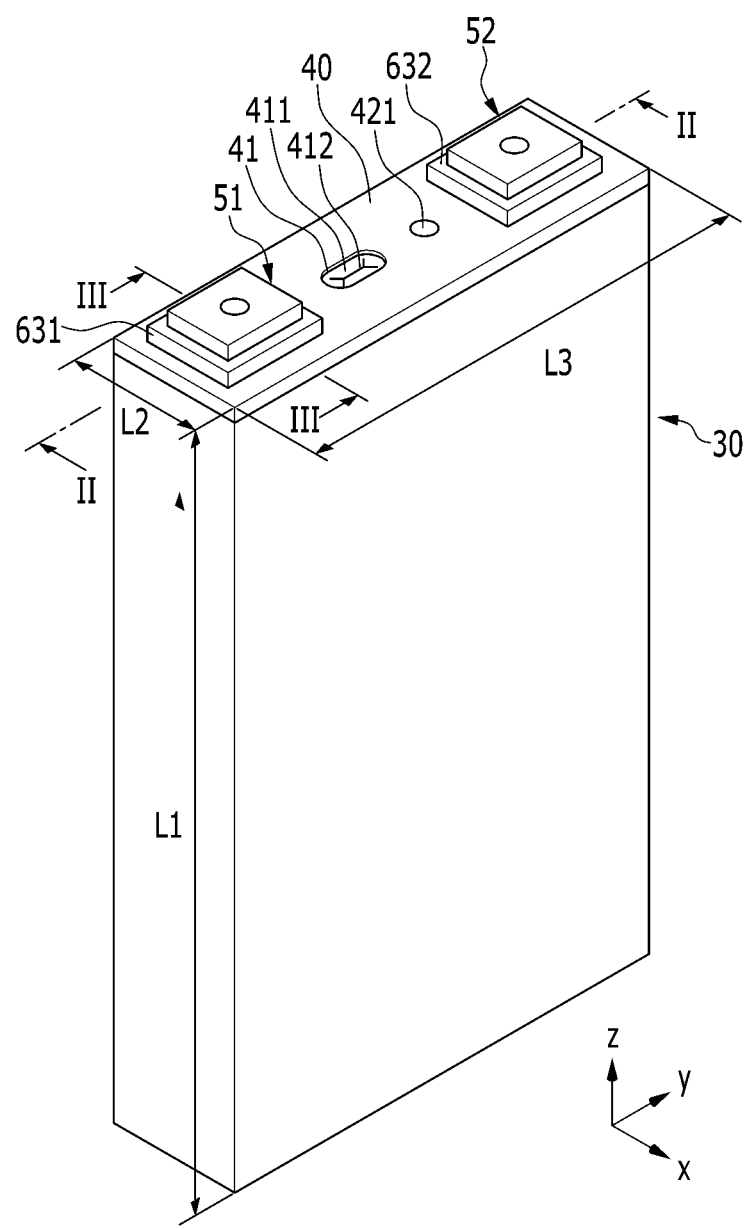
FIG. 1 is a perspective view of a rechargeable battery according to an exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
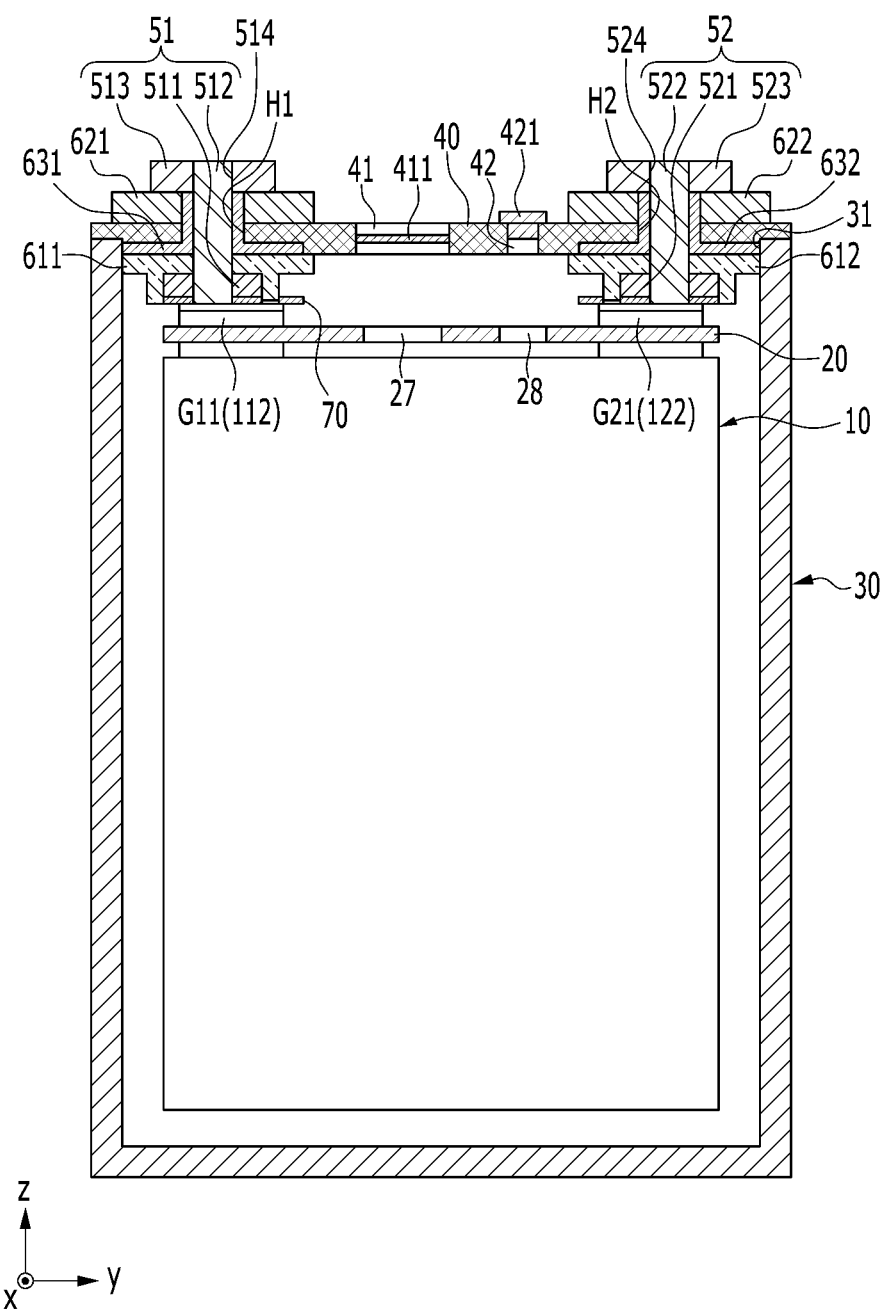
FIG. 2 is a cross-sectional view of FIG. 1, taken along the line II-II.
Figure 3:
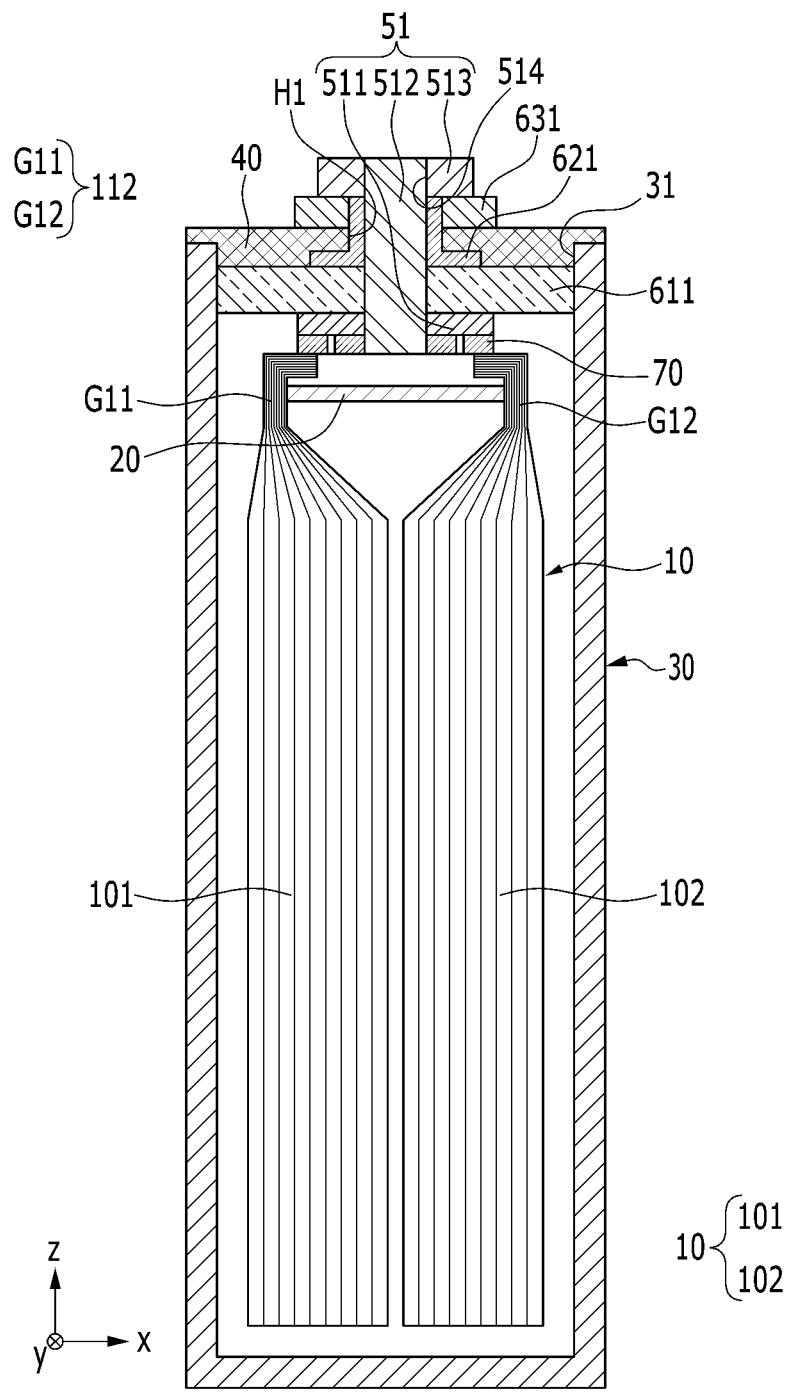
FIG. 3 is a cross-sectional view of FIG. 2, taken along the line III-III.

FIG. 1 is a perspective view of a rechargeable battery according to an exemplary embodiment of the present invention, FIG. 2 is a cross-sectional view of FIG. 1, taken along the line II-II, and FIG. 3 is a cross-sectional view of FIG. 2, taken along the line III-III.

Referring to FIG. 1 to FIG. 3, a rechargeable battery according to an exemplary embodiment includes an electrode assembly 10 that charges and discharges a current, a case 30 where the electrode assembly 10 and an electrolyte solution are embedded, a cap plate 40 that is coupled to an opening 31 of the case 30 to close and seal the opening 31, electrode terminals 51 and 52 that are provided in terminal holes H1 and H2 of the cap plate 40, and a current collecting member 70 that electrically connects the electrode assembly 10 and the electrode terminals 51 and 52.

The case 30 sets a space for receiving the electrode assembly 10 having a shape of a plate, and the electrolyte solution, and has a first length (height) L1 set along a first direction (i.e., z-axis direction). For example, the case 30 is substantially formed in the shape of a cuboid, and has a quadrangular-shaped opening 31 such that the electrode assembly 10 is inserted therein.

The cap plate 40 has a second length (width) L2 set in a second direction (i.e., x-axis direction) that crosses the first direction (z-axis direction), and a third length (length) L3 that is shorter than the first length (height) L1 and is set in a third direction (y-axis direction) that crosses the second direction (x-axis direction) so as to be coupled with the case 30 corresponding to the opening 31 to thereby close and seal the case 30. For example, the case 30 and the cap plate 40 are made of aluminum and are welded to each other in the opening 31.

In addition, the cap plate 40 further includes a vent hole 41 and an electrolyte injection opening 42. The vent hole 41 is closed and sealed by a vent plate 411 such that an internal pressure due to a gas generated in the rechargeable battery by charging and discharging of the electrode assembly 10 can be emitted to the outside.

When the internal pressure of the rechargeable battery reaches a predetermined pressure, the vent plate 411 is ruptured such that the vent hole 41 is opened and gas and an internal pressure generated due to over-charging are emitted to the outside. The vent plate 411 has a notch 412 that induces a rupture.

The electrolyte injection opening 42 allows the cap plate 40 and the case 30 to be injected with the electrolyte after the cap plate 40 is welded to the case 30. After injection of the electrolyte solution, the electrolyte injection opening 42 is sealed by a sealing cap 421.

The rechargeable battery may further include a top insulator 20 that is formed of an electrical insulation material. The top insulator 20 is disposed between the current collecting member 70 and the electrode assembly 10 and between the cap plate 40 and the electrode assembly 10.

Thus, the top insulator 20 electrically insulates the current collecting member 70 and the electrode assembly 10 while electrically insulating the electrode assembly 10 and the cap plate 40.

Since the top insulator 20 is disposed between the cap plate 40 and the electrode assembly 10, the top insulator 20 includes an interior vent hole 27. The interior vent hole 27 is formed corresponding to the vent hole 41 that is disposed in the cap plate 40, and thus an internal pressure that is increased due to gas generated from the electrode assembly 10 can be smoothly transmitted to the vent hole 41 above the top insulator 20 and then emitted to the outside.

The top insulator 20 includes an interior electrolyte injection opening 28. The interior electrolyte injection opening 28 is formed corresponding to the electrolyte injection opening 42 that is provided in the cap plate 40, and thus an electrolyte solution having passed through the electrolyte injection opening 42 can be smoothly transmitted to the electrode assembly 10 below the top insulator 20 and then injected therein.

Figure 4:
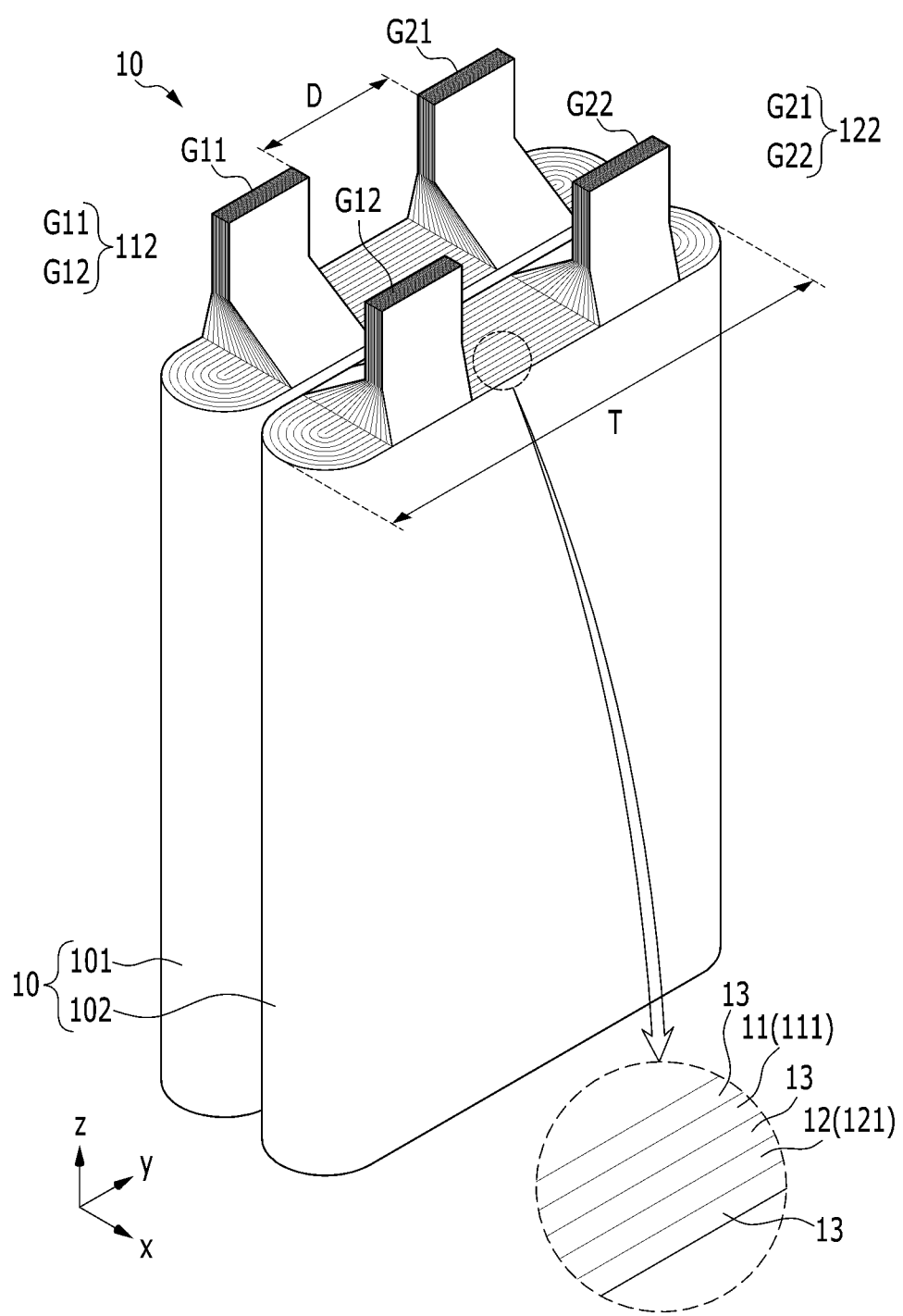
FIG. 4 is a perspective view of an electrode assembly applied to FIG. 3.

FIG. 4 is a perspective view of the electrode assembly applied to FIG. 3. Referring to FIG. 2 to FIG. 4, the electrode assembly 10 includes a first electrode 11 (e.g., a negative electrode) and a second electrode 12 (e.g., a positive electrode) that are disposed at a separator 13, which is an electrical insulator, and is formed by spirally winding the negative electrode 11, the separator 13, and the positive electrode 12.

The negative electrode 11 and the positive electrode 12 respectively include coated regions 111 and 121, each in which an active material is coated on a current corrector made of a metal thin film (e.g., Cu, Al foil), and uncoated region tabs 112 and 122, each in which a current collector is not coated with an active material and is thus exposed. The uncoated region tabs 112 and 122 are disposed at one end of the spiral-wound electrode assembly 10, and are disposed within one spiral-wound range T of the electrode assembly 10 at a distance D.

That is, the uncoated region tabs 112 of the negative electrode 11 are disposed at one side (i.e., the left side in FIG. 4) at one end (i.e., upper end in FIG. 4) of the spiral-wound electrode assembly 10, and uncoated region tabs 122 of the positive electrode 12 are disposed at the other side (i.e., right side in FIG. 4) at the same end (i.e., upper end in FIG. 4) of the electrode assembly 10 while having the distance D therebetween.

As described, the area of each of the coated regions 111 and 121 is maximized in the negative electrode 11 and the positive electrode 12, and the area of each of the uncoated regions is minimized due to the uncoated region tabs 112 and 122 such that charging capacity of the electrode assembly 10 can be increased.

In addition, the uncoated region tabs 112 and 122 are provided for every spiral-wind of the electrode assembly 10 to let a charge or discharge current flow, and accordingly the entire resistance of the uncoated regions 112 and 122 is reduced. Thus, the electrode assembly 10 can charge and discharge a high current through the uncoated region tabs 112 and 122.

The electrode assembly 10 may be provided as a single body, but in the present exemplary embodiments, two electrode assemblies are provided. That is, the electrode assembly 10 includes a first assembly 101 and a second assembly 102 that are disposed in parallel with each other in the second direction (x-axis direction).

In addition, each of the first and second assemblies 101 and 102 may be formed in the shape of a plate of which opposite ends in the y-axis direction are semi-circular so as to be received in the approximately rectangular shaped case 30. The first and second assemblies 101 and 102 are received in an internal space of the case 30 set by first, second, and third lengths L1, L2, and L3 and the cap plate 40.

Figure 5:
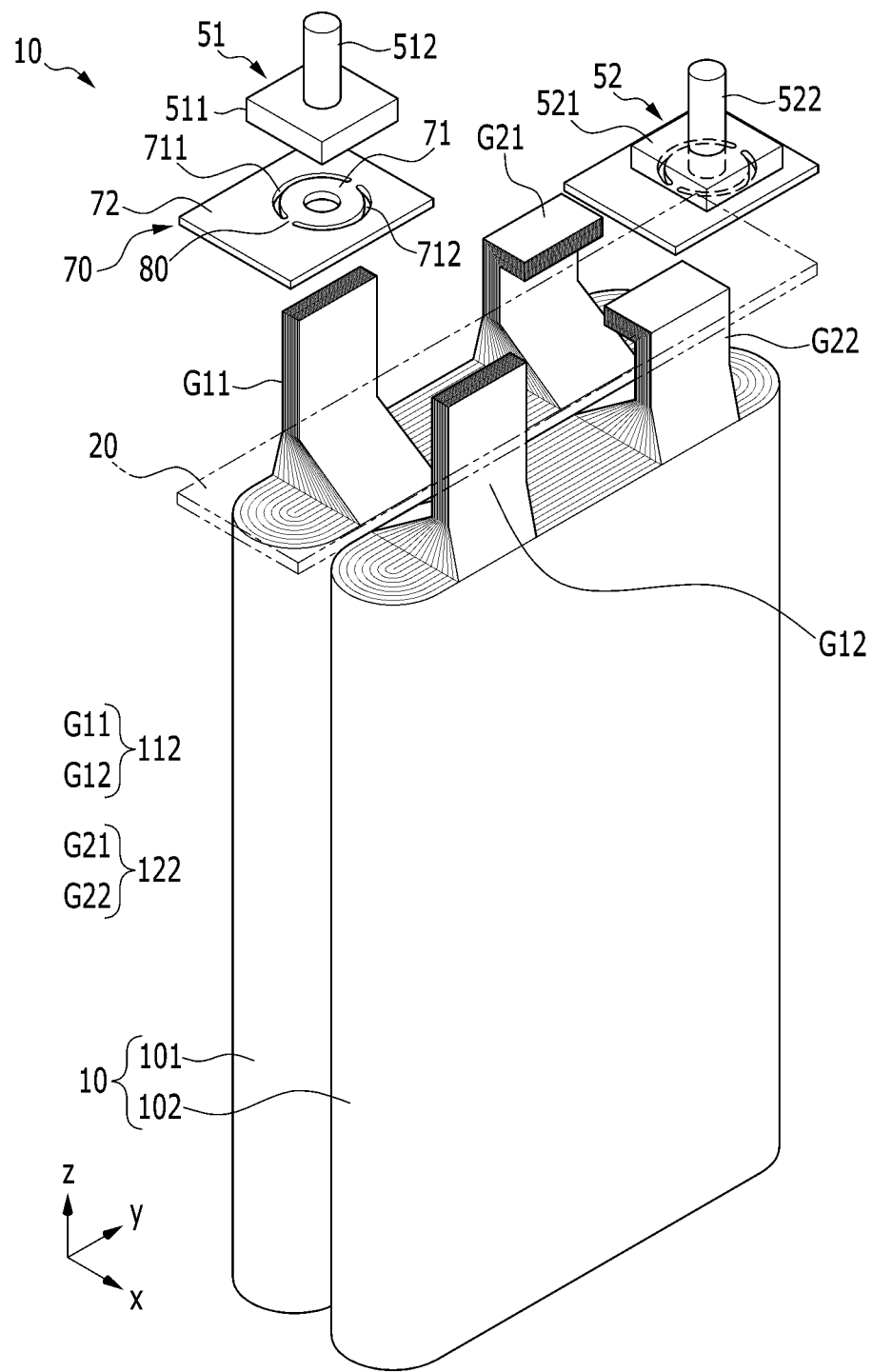
FIG. 5 is a perspective view of the electrode assembly of FIG. 3 in a state of being connected and disconnected with electrode terminals.

FIG. 5 is a perspective view of the electrode assembly of FIG. 3 in a state of being connected and disconnected with electrode terminals. Referring to FIG. 2 to FIG. 5, the electrode assembly 10, that is, the first and second assemblies 101 and 102, are disposed in parallel.

The current collecting member 70 is disposed between the cap plate 40 and the electrode assembly 10 and connects the electrode terminals 51 and 52 with the uncoated region tabs 112 and 122, and includes a fuse 80 that is provided in a corresponding region Al of the electrode terminals 51 and 52.

The electrode terminals 51 and 52 are respectively provided in the terminal holes H1 and h2 of the cap plate 40, and are electrically connected to the first assembly 101 and the second assembly 102 through the current collecting member 70 and the uncoated region tabs 112 and 122 to discharge a current from the first and second assemblies 101 and 102 or charge a current to the first and second assemblies 101 and 102.

The electrode terminals 51 and 52 may be formed with the same structure. The electrode terminals 51 and 52 include rivet portions 512 and 522, interior plates 511 and 521, and exterior plates 513 and 523.

The electrode terminals 51 and 52 are electrically insulated from the cap plate 40 by disposing interior insulation members 611 and 612 and gaskets 621 and 622 between the electrode terminals 51 and 52 and an internal surface of the cap plate 40. The interior insulation members 611 and 612 are closely attached to the cap plate 40 through one ends thereof, and the other ends of the interior insulation members 611 and 612 partially surround the rivet portions 512 and 522 while supporting the interior plates 511 and 521 such that a connection structure of the electrode terminals 51 and 52 and the uncoated region tabs 112 and 122 is stable.

The gaskets 621 and 622 are provided between the rivet portions 512 and 522 of the electrode terminals 51 and 52 and the internal surfaces of the terminal holes H1 and H2 of the cap plate 40 to seal and electrically insulate between the rivet portions 512 and 522 and the terminal holes H1 and H2 of the cap plate 40.

In addition, the gaskets 621 and 622 farther extend between the interior insulation members 611 and 612 and the internal surface of the cap plate 40 to more firmly seal between the interior insulation members 611 and 612 and the cap plate 40.

The rivet portions 512 and 522 are inserted into the gaskets 621 and 622 by disposing the rivet portions 512 and 522 therebetween and exterior plates 513 and 523 are inserted into coupling holes 514 and 524 by disposing exterior insulation members 631 and 632, and then the peripheries of the coupling holes 514 and 524 are caulked or welded such that the rivet portions 512 and 524 are fixed to the exterior plates 513 and 523. Thus, the electrode terminals 51 and 52 can be installed with an insulation and sealing structure in the cap plate 40.

As described, the rivet portions 512 and 522 are provided in the terminal holes H1 and H2 and protrude outside the cap plate 40. The rivet portions 512 and 522 are connected with the interior plates 511 and 521 in the cap plate 40, and with the exterior plates 513 and 523 at an outer side of the cap plate 40.

That is, the rivet portions 512 and 522 mechanically and electrically connect the interior plates 511 and 521 and the exterior plates 513 and 523. In addition, the rivet portions 512 and 522 and the interior plates 511 and 521 are connected and contact the current collecting member 70 in the cap plate 40.

Figure 6:
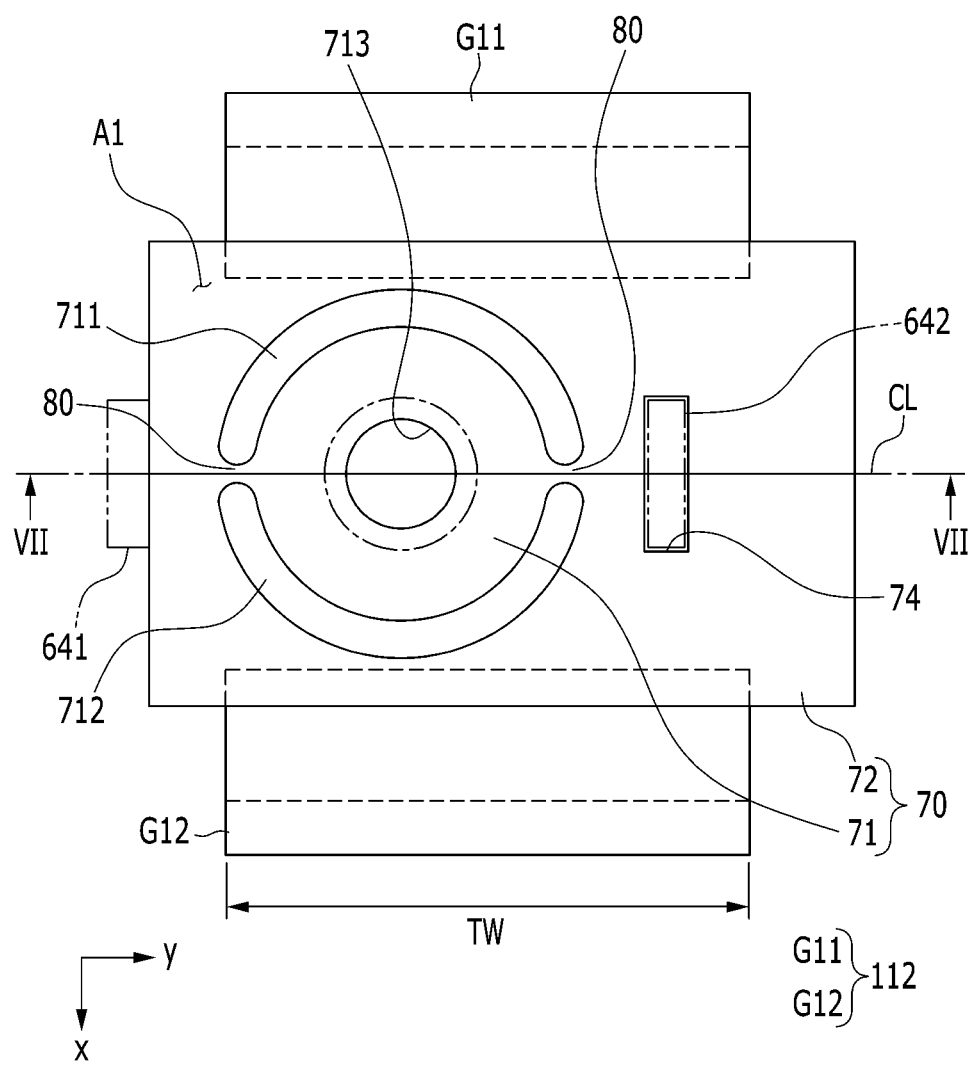
FIG. 6 is a top plan view of a state that the current collecting member which includes the fuse, and the uncoated region tabs, are connected.
Figure 7:
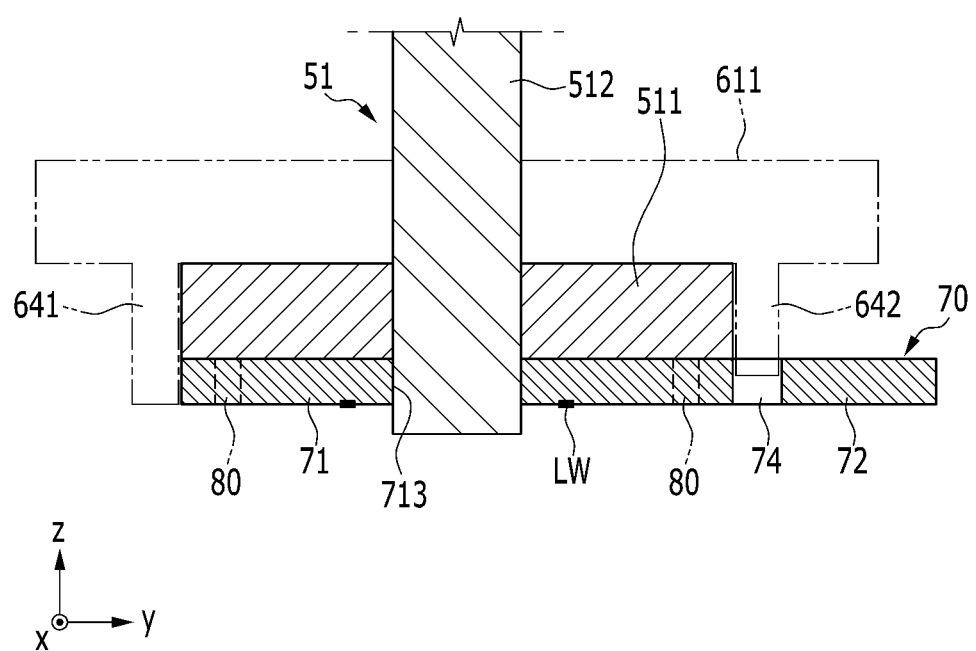
FIG. 7 is a cross-sectional view of FIG. 6, taken along the line VII-VII.

FIG. 6 is a top plan view of a state that the current collecting member which includes the fuse, and the uncoated region tabs, are connected, and FIG. 7 is a cross-sectional view of FIG. 6, taken along the line VII-VII. For convenience of description, with respect to the electrode terminal 51 at one side, referring to FIG. 6 and FIG. 7, the corresponding region A1 in the current collecting member 70 faces in the z-axis direction in the interior plate 511, and the fuse 70 is provided in the corresponding region A1.

The corresponding region Al enables installation of the fuse 80 by assuring a space for forming the fuse 80 in the current collecting member 70 even when the third length L3 of the cap plate 40 and the case 30 in the third direction (y-axis direction) is short, that is, even when an internal space of the rechargeable battery is narrow. That is, the corresponding region A1 enables installation difficulty due to lack of the internal space to be overcome.

The current collecting member 70 includes a terminal connection portion 71 that is connected to the rivet portion 512 and a tab connection portion 72 that is provided at an outer side of the terminal connection portion 71 by disposing the fuse 80 therebetween and connected to the uncoated region tab 112. That is, since the terminal connection portion 71 and the tab connection portion 72 are not disposed in the y-axis direction but are disposed in the x-axis direction in the current collecting member 70, the fuse 80 can be installed even through the third length L3 in the y-axis direction is short.

The terminal connection portion 71 is connected with the rivet portion 512 while leaning to one side in the third direction (y-axis direction) on a center line CL that is set along the third direction (y-axis direction) from the center of the second direction (x-axis direction). The rivet portion 512 is coupled to a through-hole 713 formed in the terminal connection portion 71, and for example, the terminal connection portion 71 is laser-welded (LW) to the interior plate 511.

Referring back to FIG. 2 to FIG. 7, the uncoated region tabs 112 and 122 may be provided as a plurality of groups. The uncoated region tabs 112 and 122 pass through opposite sides of the top insulator 20 in the second direction (x-axis direction) and thus are connected to the current collecting members 70.

For example, the uncoated region tabs 112 and 122 include first tab groups G11 and G21 and second tab groups G12 and G22. The first tab groups G11 and G21 are respectively connected to the negative electrode 11 and the positive electrode 12 of the first assembly 101, and the second tab groups G12 and G22 are respectively connected to the negative electrode 11 and the positive electrode 12 of the second assembly 102.

The first tab groups G11 and G21 are bent toward the opposite side from one side of the second direction (x-axis direction) and connected to the tab connection portion 72, while disposing the fuse 80 therebetween. The second tab groups G12 and G22 are bent toward the first tab groups G11 and G21 at the opposite of the first tab groups G11 and G21 in the second direction (x-axis direction), and then connected to the tab connection portion 72.

The first tab groups G11 and G21 and the second tab groups G12 and G22 are respectively disposed at opposite sides of the second direction (x-axis direction) at the center of the third direction (y-axis direction) of the terminal connection portion 71, and are welded to the bottom side of the terminal connection portion 71. In this case, the first tab groups G11 and G21 and the second tab groups G12 and G22 each has a tab width TW set along the third direction (y-axis direction), and the tab width TW faces the center of the rivet portion 512 in the second direction (x-axis direction).

That is, the terminal connection portion 71 and the tab connection portion 72 overlap each other in the third direction (y-axis direction). Such an overlap structure enables installation of the fuse 80 in the current collecting member 70 even when the cap plate 40 and the case 30 have short third lengths L3 in the third direction (y-axis direction) and thus the rechargeable battery has a narrow internal space.

For example, the current collecting member 70 includes a first slot 711 and a second slot 712 that partition the terminal connection portion 71 and the tab connection portion 72 into two sides along the second direction (x-axis direction). The first and second slots 711 and 712 enable the terminal connection portion 71 and the tab connection portion 72 to be overlapped with each other in the y-axis direction.

The fuse 80 is set between the first slot 711 and the second slot 712 at opposite sides of the third direction (y-axis direction) to electrically connect the terminal connection portion 71 and the tab connection portion 72 along the y-axis direction. In the present exemplary embodiment, fuses 80 are provided at opposite sides of the y-axis direction, but may be provided singularly or plurally within a range that can interrupt currents of the terminal connection portion 71 and the tab connection portion 72.

The first slot 711 and the second slot 712 are respectively formed in the shape of arcs that face each other while being concave toward the center of the terminal connection portion 71 at opposite sides in the second direction (x-axis direction). Thus, the terminal connection portion 71 formed in the first and second slots 711 and 712 may be firmly mechanically and electrically connected to the rivet portion 512.

Although it is not illustrated, the first and second slots 711 and 712 may be formed in the shape of polygons, each having a fuse at some sides thereof. Internal sides of the polygon-shaped first and second slots may form a terminal connection portion, and external sides thereof may form a tab connection portion.

Figure 8:
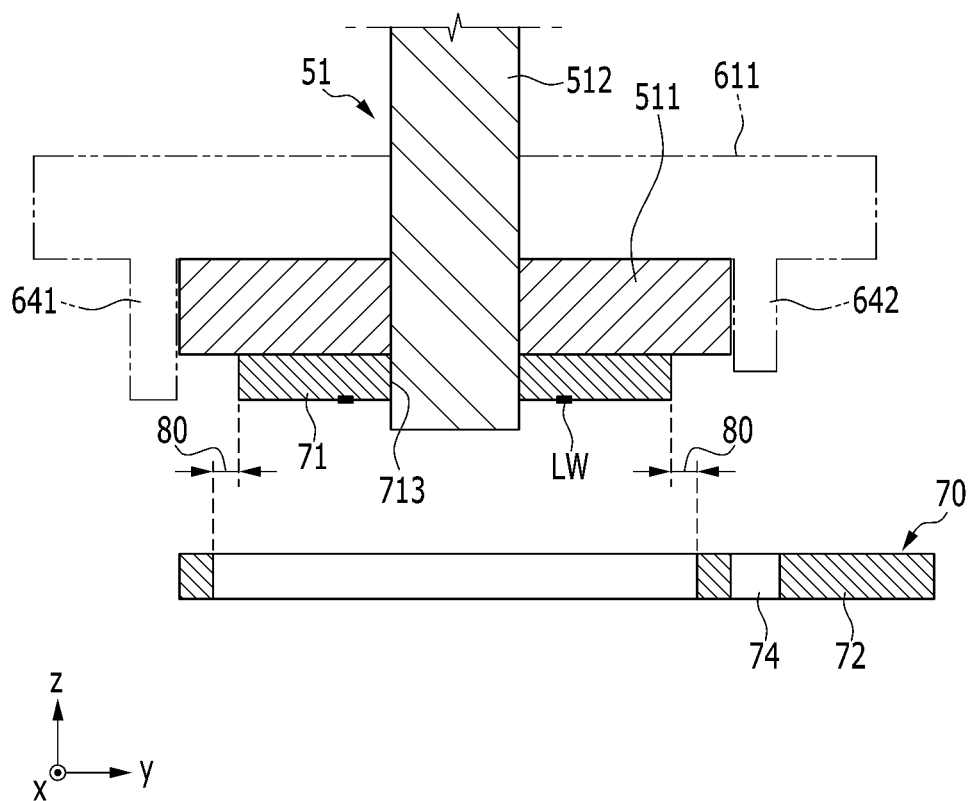
FIG. 8 is a cross-sectional view of a state that the fuse is disconnected in FIG. 7.

FIG. 8 is a cross-sectional view of a state that the fuse in FIG. 7 is disconnected. Referring to FIG. 2 and FIG. 6 to FIG. 8, the interior insulation member 611 includes a first protrusion 641 and a second protrusion 642, which protrude toward the first direction (z-axis direction) corresponding to the current collecting member 70 from the third direction (y-axis direction).

The first protrusion 641 supports the current collecting member 70 by corresponding to a side surface of the current collecting member 70, and the second protrusions 642 is coupled to a hole 74 that is formed in the cap connection portion 72 of the current collecting member 70. The first and second protrusions 641 and 642 induce drop separation in the first direction (z-axis direction) when the fuse 80 is disconnected, and thus the tab connection portion 72 is separated together with the uncoated region tab 112 from the terminal connection portion 71.

When the fuse 80 is disconnected due to overcurrent or some other reason, the terminal connection portion 71 maintains a connection state with the rivet portion 512 in the current collecting member 70, and the tab connection portion 72 is separated from the terminal connection portion 71 while being connected with the uncoated region tab 112. Thus, a current path between the electrode terminal 51 and the electrode assembly 10 can be disconnected.

In addition, the first and second protrusions 641 and 642 form blocking members in the first direction (z-axis direction), and thus can prevent the tab connection portion 72 from being connected again with the terminal connection portion 71 after being disconnected due to operation of the fuse 80.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

DESCRIPTION OF SYMBOLS

| | |
|---|---|
| 10: electrode assembly | 11: first electrode (negative electrode) |
| 12: second electrode (positive electrode) | 13: separator |
| 20: top insulator | 27: interior vent hole |
| 28: interior electrolyte injection opening | 30: case |
| 31: opening | 40: cap plate |
| 41: vent hole | 42: electrolyte injection opening |
| 51, 52: electrode terminal | 70: current collecting member |
| 71: terminal connection portion | 72: tab connection portion |
| 74: hole | 80: fuse |
| 101, 102: first, second assembly | 111, 121: coated region |
| 112, 122: uncoated region top | 411: vent plate |
| 412: notch | 421: sealing cap |
| 511, 521: interior plate | 512, 522: rivet portion |
| 513, 523: exterior plate | 514, 524: coupling hole |
| 611, 612: interior insulation member | 621, 622: gasket |
| 631, 632: exterior insulation member | |
| 641, 642: first, second protrusion | |
| 711: first slot | 712: second slot |
| 713: through-hole | A1: corresponding region |
| CL: center line | D: distance |
| G11, G21: first tab group | G12, G22: second tab group |
| H1, H2: terminal hole | L1: first length (height) |
| L2: second length (width) | L3: third length (length) |
| T: spiral-wound range | TW: tab width |

The invention claimed is:

1. A rechargeable battery comprising:
an electrode assembly including uncoated region tabs that protrude toward one side of a coated portion;
a case having a first length set in a first direction to receive the electrode assembly;
a cap plate having a second length set in a second direction that crosses the first direction and a third length that is shorter than the first length and set in a third direction that crosses the second direction so as to be coupled corresponding to an opening of the case;
an electrode terminal that is provided in a terminal hole of the cap plate; and
a current collecting member that is disposed between the cap plate and the electrode assembly to connect the electrode terminal and the uncoated region tabs, and includes a fuse in a corresponding region of the electrode terminal, facing in the first direction,
wherein the electrode terminal comprises:
a rivet portion that is provided in the terminal hole of the cap plate;
an exterior plate that is disposed at an outer side of the cap plate and connected to the rivet portion; and
an interior plate that is disposed at an inner side of the cap plate to connect the rivet portion and the current collecting member.

2. The rechargeable battery of claim 1, wherein the corresponding region is set in the interior plate, facing in the first direction, and the fuse is provided in the corresponding region.

3. The rechargeable battery of claim 1, wherein the current collecting member comprises:
a terminal connection portion connected to the rivet portion; and
a tab connection portion that is provided at an outer side of the terminal connection portion and connected to the uncoated region tabs while disposing the fuse therebetween.

4. The rechargeable battery of claim 3, wherein the electrode assembly comprises a first assembly and a second assembly that are disposed in parallel with each other in the second direction, and
the uncoated region tabs comprise a first tab group connected to the first assembly and a second tab group connected to the second assembly.

5. The rechargeable battery of claim 4, wherein the terminal connection portion is connected to the rivet portion while leaning to one side of the third direction on a center line that is set by extending in the third direction from the center of the second direction, and
the rivet portion is coupled by welding to a through-hole that penetrates the interior plate and formed in the terminal connection portion.

6. The rechargeable battery of claim 5, wherein the first tab group is bent toward the opposite side at one side of the second direction and is connected to the tab connection portion, while disposing the fuse therebetween, and
the second tab group is bent toward the first tab group at the opposite side of the first tab group in the second direction and is connected to the tab connection portion.

7. The rechargeable battery of claim 6, wherein the first tab group and the second tab group are respectively disposed at opposite sides of the second direction in the center of the terminal connection portion in the third direction and welded thereto.

8. The rechargeable battery of claim 7, wherein the first tab group and the second tab group each comprise a tab width set along the third direction, and the tab width faces the center of the rivet portion in the second direction.

9. The rechargeable battery of claim 4, wherein the current collecting member comprises a first slot and a second slot that set the terminal connection portion at the center of the second direction and divide the tab connection portion into two sides in the second direction at an outer edge of the terminal connection portion, and
the fuse is set between the first slot and the second slot at opposite sides of the third direction.

10. The rechargeable battery of claim 9, wherein the first slot and the second slot are formed in the shape of arcs that face each other while being concave toward the center of the terminal connection portion at opposite sides of the second direction.

11. The rechargeable battery of claim 2, wherein an interior insulation member comprises a first protrusion and a second protrusion that protrude toward the first direction corresponding to the current collecting member at opposite sides of the third direction.

12. The rechargeable battery of claim 11, wherein the first protrusion corresponds to a side surface of the current collecting member, and the second protrusion is coupled to a hole formed in the current collecting member.

* * * * *

UNITED STATES PATENT AND TRADEMARK OFFICE
CERTIFICATE OF CORRECTION

PATENT NO. : 11,075,434 B2
APPLICATION NO. : 16/303109
DATED : July 27, 2021
INVENTOR(S) : Myungjae Jang It is certified that error appears in the above-identified patent and that said Letters Patent is hereby corrected as shown below:

In the Claims

Column 10, Line 29, Claim 9      Delete "claim 4," and
Insert -- claim 3, --

Signed and Sealed this
Ninth Day of August, 2022

Katherine Kelly Vidal
*Director of the United States Patent and Trademark Office*